United States Patent [19]

Fukahori et al.

[11] 4,232,958
[45] Nov. 11, 1980

[54] MEANS FOR ADVANCING FILM IN CAMERAS HELD IN VARIOUS FILM FRAME ORIENTATIONS

[75] Inventors: Hidehiko Fukahori, Kawasaki; Tomonori Iwashita, Fuchu; Yukio Mashimo, Tokyo, all of Japan

[73] Assignee: Canon Kabushiki Kaisha, Tokyo, Japan

[21] Appl. No.: 58,205

[22] Filed: Jul. 17, 1979

[30] Foreign Application Priority Data

Jul. 18, 1978 [JP] Japan ................................ 53-87327

[51] Int. Cl.³ .................... G03B 1/00; G03B 7/26; G03B 17/02; G03B 17/38
[52] U.S. Cl. .................................. 354/212; 354/60R; 354/202; 354/266; 354/288; 354/293; 354/295
[58] Field of Search ............... 354/82, 202, 60 R, 204, 354/205, 212, 266, 267, 293, 294, 295, 288, 76, 81, 170, 171; 242/71.3, 71.4, 71.5, 71

[56] References Cited

U.S. PATENT DOCUMENTS

| | | | |
|---|---|---|---|
| 1,253,078 | 1/1918 | Mordaunt | 242/71.4 |
| 1,600,759 | 9/1926 | Griffiths | 242/71.5 |
| 2,150,693 | 3/1939 | Mihalyi | 354/205 |
| 3,736,015 | 5/1973 | Dierks et al. | 354/212 X |
| 3,853,396 | 12/1974 | Ogiso et al. | 354/212 X |
| 4,037,240 | 7/1977 | Ando et al. | 354/212 |
| 4,167,314 | 9/1979 | Ichiyanagi et al. | 354/295 X |

*Primary Examiner*—L. T. Hix
*Assistant Examiner*—William B. Perkey
*Attorney, Agent, or Firm*—Toren, McGeady and Stanger

[57] ABSTRACT

In the disclosed camera, a manually operated film advance lever and a shutter button are arranged conveniently to be operated when the camera is held for a horizontal shot, i.e., an exposure during which the film frame is oriented horizontally. A coupling arrangement, in an adapter suitable for mounting on the camera, engages a camera film winder and shutter release and contains a second winding lever and a second shutter release button both oriented in a position suitable for taking a vertical shot.

9 Claims, 8 Drawing Figures

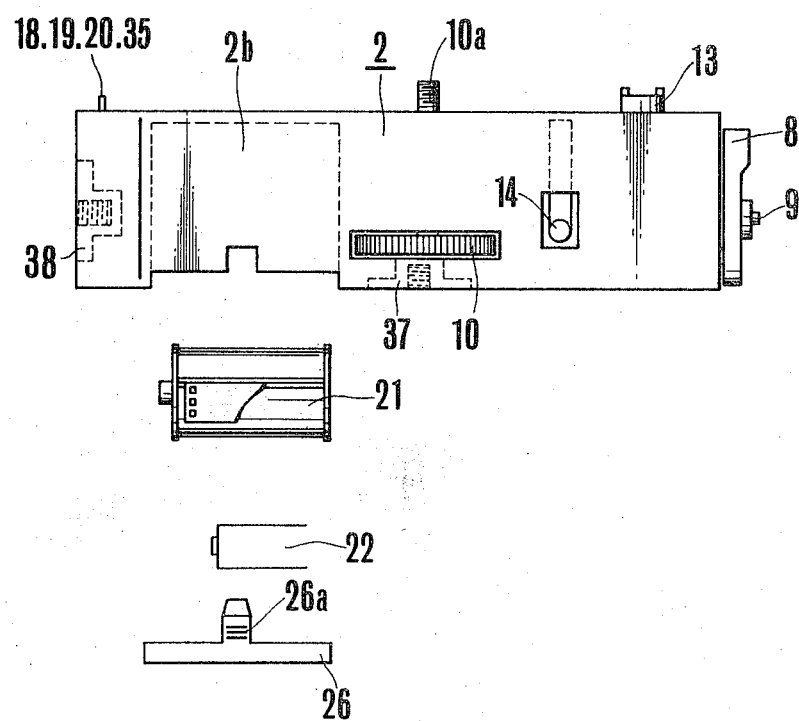

MEANS FOR ADVANCING FILM IN CAMERAS HELD IN VARIOUS FILM FRAME ORIENTATIONS

BACKGROUND OF THE INVENTION

This invention relates to film winding or advancing mechanisms, and particularly to means for adapting a camera, which is normally held so that an elongated picture format extends horizontally, for rapid advance of the film when the camera is held for vertical "shots", i.e., when the camera is held so that the elongated picture format is upright or vertical.

The invention relates particularly to an adapter for vertical shots, which adapter when attached to a camera having an elongated horizontal picture format in the normal exposure position, such as a general purpose small size camera, permit comfortable manual operation of the rapid wind lever and the shutter release button while the camera is held in a position suitable for a vertical picture format. The invention also relates to a camera system using this adapter.

Rapid wind levers and shutter release buttons on standard 35 mm. cameras are arranged to facilitate taking horizontally elongated pictures. Such an arrangement can become inconvenient when the camera that is held vertically for taking vertically elongated pictures. In other words, when a vertical picture is to be taken, the operator needs first to hold the camera in a normal or horizontal position for cocking the film advance lever, and then to turn the camera for a vertical shot. Alternatively, he may cock the lever while holding the camera vertically. Photographers relying upon the former method are apt to remove their eyes from the finders during the film advance operation, and often miss opportunities for taking good pictures. Those relying upon the latter method need to position their own hands uncomfortably, not only for operating the winding lever, but also for actuating the shutter release button. This makes it more difficult to operate the camera while holding it steady, and increases the possibility of missing good pictures altogether.

Thus, although commonly available standard size or 35 mm cameras are very convenient for horizontal shots, holding such a camera vertically, something which may be necessary for portrait photography, is less convenient because the hands must be twisted as described.

One attempt to overcome these difficulties uses a grip removably attached to a camera body and provided with a lever and a shutter release button in addition to those on the housing of the camera body. The winding lever and the shutter release button on the grip housing are operatively connected to the film advance and shutter release mechanisms in the camera body. Such a grip is disclosed in U.S. Pat. No. 4,037,240.

Such a grip makes the camera far more manageable. It makes it possible to hold the camera steady by grasping the grip and using the right thumb and index finger easily to operate the rapid wind lever and the shutter release button while the right hand simultaneously grasps the grip. However, as previously mentioned, this advantage is only available when the camera is held horizontally. The camera manageability for vertical pictures is not improved over cameras without the grip.

Known motor drive units provide additional shutter release buttons located for vertical shots. However, none of them provide a convenient arrangement for manual winding when the picture frame is held vertically.

An object of the invention is to overcome these disadvantages.

SUMMARY OF THE INVENTION

According to the invention, an adapter is removably attached to the housing of a camera body for actuating the film advance and shutter release operation for vertical shots with the same convenience as pictures with a horizontal picture format. According to a feature of the invention, this involves providing a second rapid wind lever and a second shutter release button at a location convenient for vertical pictures.

According to another feature of the invention, the adapter is made as small as possible and as light in weight as possible so that upon attachment to a camera, it will permit viewing and exposure of vertical pictures while holding the camera steady.

These and other features of the invention are pointed out in the claims. Other objects and advantages of the invention will be evident from the following detailed description when read in light of the accompanying drawings.

BRIEF DESCRIPTION OF THE DRAWINGS

FIG. 8 is a side elevational view of the adapter of FIG. 7 with a chamber for accommodating a spare element illustrated by phantom lines.

DETAILED DESCRIPTION OF PREFERRED EMBODIMENTS

Figure 1:
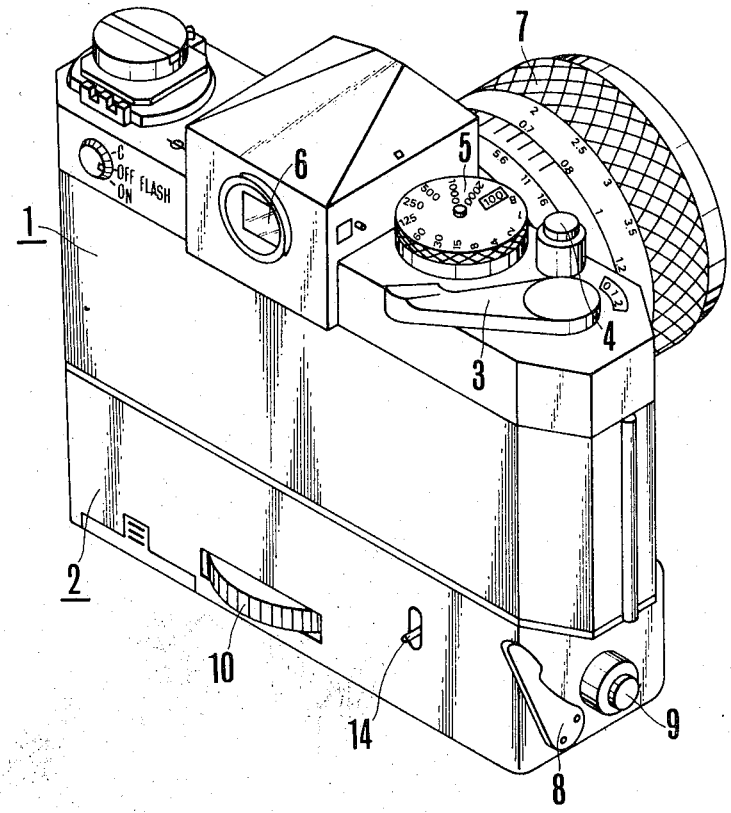
FIG. 1 is a perspective view illustrating a system, with a standard single lens reflex camera and an adapter for permitting vertical orientation of the picture formal, embodying features of the present invention.

In the perspective view of FIG. 1, a camera system is composed of a standard single lens reflex camera and a rapid wind vertical picture adapter. Here, a camera body 1 has secured thereto an adapter 2 for permitting rapid winding and shutter release while the camera body 1 is held vertically. The adapter 2 is secured to the bottom panel of the camera housing by a fastener engaging the tripod screw hole. The camera body includes a winding lever 3 on the camera housing, a shutter button 4, a shutter speed and film speed dial 5, a viewfinder 6, and an objective lens 7, all of which form a standard single lens reflex camera. A winding lever 8 and a shutter button 9 are mounted on the adapter 2 to be used when the camera is held vertically. Preferably, the winding lever 8 and the release button 9 are arranged in a configuration similar to that of the lever 3 and button 4 on the camera housing. A knob 10 contains a thumb wheel and serves to fasten the adapter to the camera body by engaging a threaded tripod hole on the bottom wall of the camera housing. A rewind control lever 14 cooperates with a rewind control button arranged on the bottom wall of the camera housing and, upon upward movement of the lever, switches the camera to the rewind mode.

Figure 2:
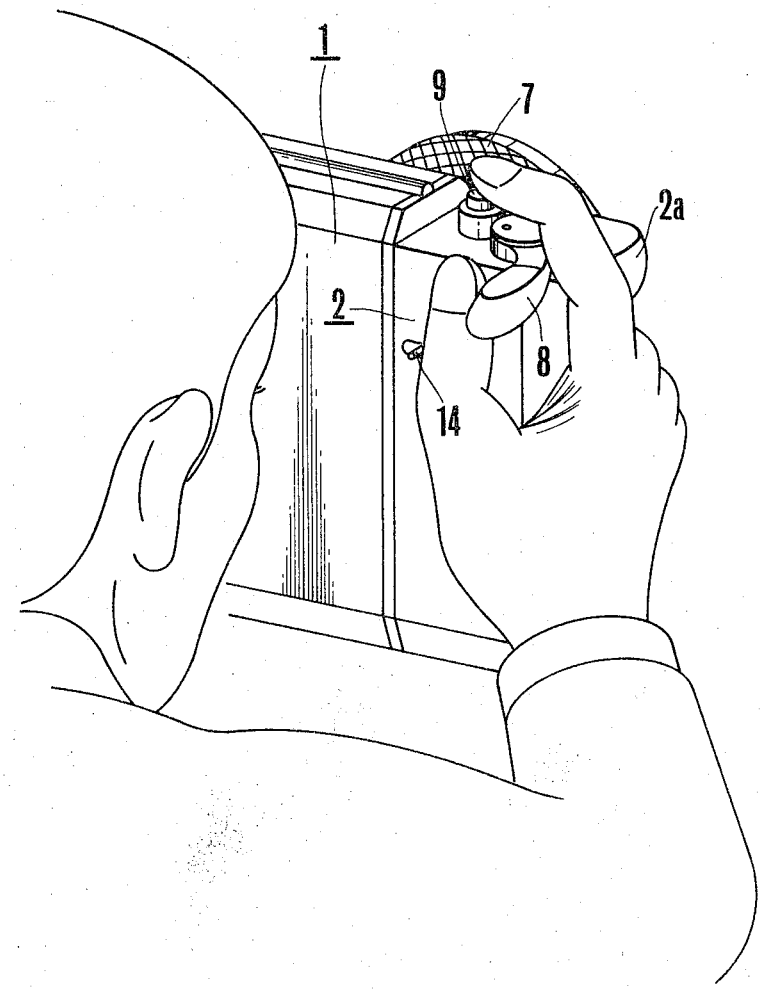
FIG. 2 illustrates a photographer holding the adapter-equipped camera of FIG. 1 vertically.

FIG. 2 shows one pose of a photographer holding the camera body 1 with the attached adapter 2 for a vertical shot or picture. Here, the same reference numerals refer to parts similar to those in FIG. 1. A projection 2a forms a finger abuttment. The configuration of the other portions of the adapter 2 which are held by the right hand and the arrangement of the release button and winding lever are, as mentioned, preferably analogous to the configuration of the portion of the camera body grasped and to the arrangement of the release button and winding lever in the camera.

When the camera body 1 and the adapter are attached, and when the operator uses the camera 1 in the horizontal position, the operator's right hand, while holding the camera body 1, may depress the shutter button and manipulate the winding lever to perform a winding operation in the manner to which the operator is normally accustomed. On the other hand, when the camera system is used in the vertical position, as shown in FIG. 2, the release button 9 and the winding lever are similarly manipulatable in the usual manner. Thus, the same convenience of operation can be expected regardless of whether the camera body 1 is used in the horizontal or vertical position. The operator may assume virtually the same pose for horizontal and vertical shots in effecting the winding and releasing operation of the camera.

Figure 3:
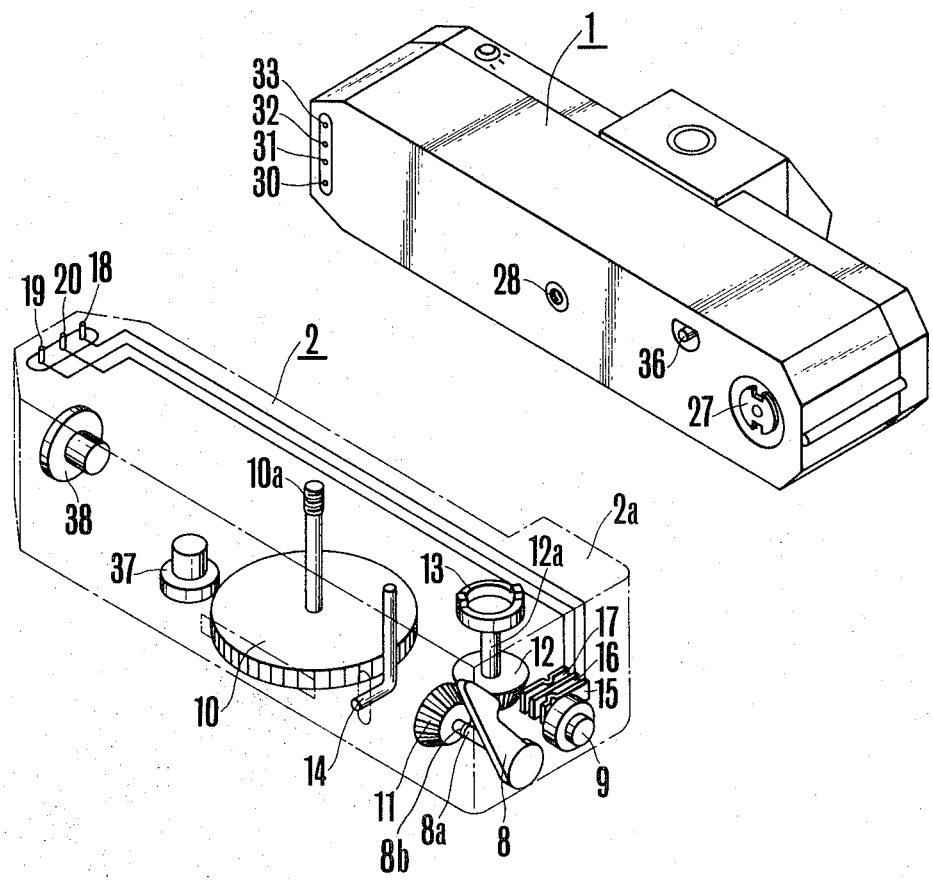
FIG. 3 is a perspective view of the main parts of an adapter for vertical frame format, and a camera, embodying the features of the present invention.

FIG. 3 illustrates an embodiment of a construction and arrangement of the main parts of the vertical shutter-release and winding adapter of FIG. 1 and the bottom panel of the housing of a camera body 1 to which the adapter 2 is attachable. Here, a rotary shaft 8a of the winding lever 8 mounted on the side panel of the housing of the adapter 2 is connected through a one-way clutch 8b to a gear 11. A gear 12 engaging the gear 11 transmits rotation through a shaft 12a to a winding coupler 13. A light measuring switch 15,16 and a release switch 16,17 are arranged to close when the release button 9 is depressed and are connected to contacts 18, 19 and 20 by conductive wires. The fastener knob 10 when operated at the portion projecting out of the side panel of the adapter housing threads a screw 10a formed in the top end portion of a shaft thereon into a tripod screw hole 28 in the camera housing. This secures the adapter 2 to the camera body 1. When the adapter is secured to the housing 1, the winding coupler 13 engages a coupler 27 on the winding shaft of the camera body and connects the contacts 18, 19 and 20 with the contacts 30, 31 and 32, respectively on the bottom panel of the camera housing. A rewind button 14 serves as a sprocket release lever. When the lever 14 is lifted while the adapter 2 is attached to the housing body 1, a sprocket release button 36 on the camera housing is pressed to idle the film sprocket. A female screw 37 on the housing of the adapter 2 receives a tripod stud when the camera is mounted horizontally on a tripod and a female screw 38 on the housing of the adapter 2 receives a tripod bolt when the camera is vertically mounted on a tripod. The winding coupler 27 and the contacts 30 to 33 on the camera can be used when the adapter is replaced by a motor drive unit (not shown).

Figure 4:
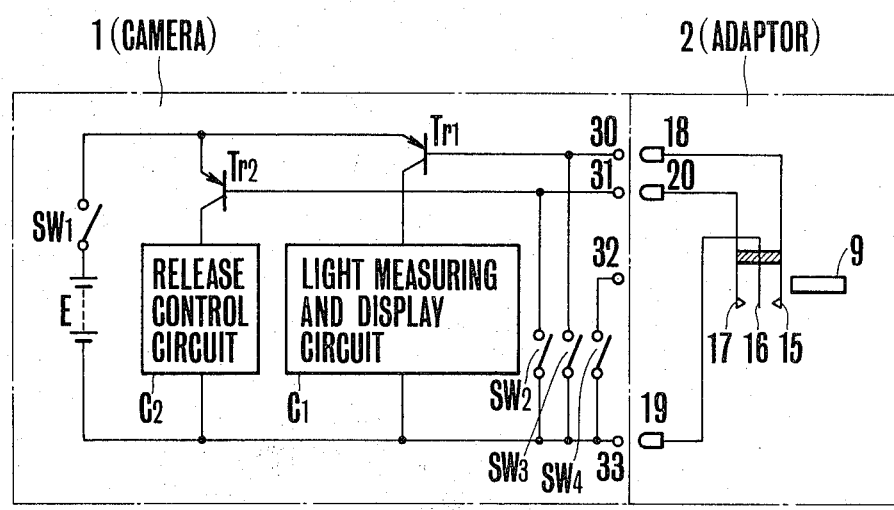
FIG. 4 is an electrical circuit diagram illustrating the electrical connection between the adapter and the camera body shown in FIG. 3.

FIG. 4 illustrate the elctrical system of an arrangement embodying the present invention. When the adapter 2 is attached to the camera body 1, the contacts 18, 19 and 20 engage the contacts 30, 33 and 31, respectively to establish an operating circuit. When the release button 9 on the adapter 2 is depressed, it first turns on the light measuring switch 15, 16 and then the release switch 16, 17. A release switch SW2 and a light measuring switch SW3 in the camera body are turned on when the release button on the camera housing is depressed. A switch SW4 is turned off when the winding operation is completed and turned on when the release is completed. A main switch SW1 energizes the circuit by providing current from an electrical power source or battery E. An electrical power supply control transistor Tr1 supplies power to a light measuring and display circuit C1. An electrical power supply control transistor Tr2 supplies power to a release control circuit C2. The supply of power to the individual circuits starts when the release button either on the camera housing or on the adapter housing is depressed to close the respective switches. Therefore, with the camera body carrying the adapter 2, it is possible to perform an exposure operation by operating either one of the two buttons.

The light measuring circuit C1 may be of the conventional type, for example, composed of a photoelectric element for receiving light from an object being photographed, and a meter whose needle is deflected to a position representing an exposure value when the transistor Tr1 is turned on and supplies a current proportional to the output of the photoelectric element to the winding of the meter. The control circuit C2 may also be conventional and composed, for example, of an electromagnet whose energization is controlled by the transistor Tr2 to effect operation of a release mechanism of the camera. According to another embodiment of the invention, the control circuit C2 includes circuitry for automatically adjusting the shutter or diaphragm value of the camera in accordance with the output of the circuit C1.

Figure 5:
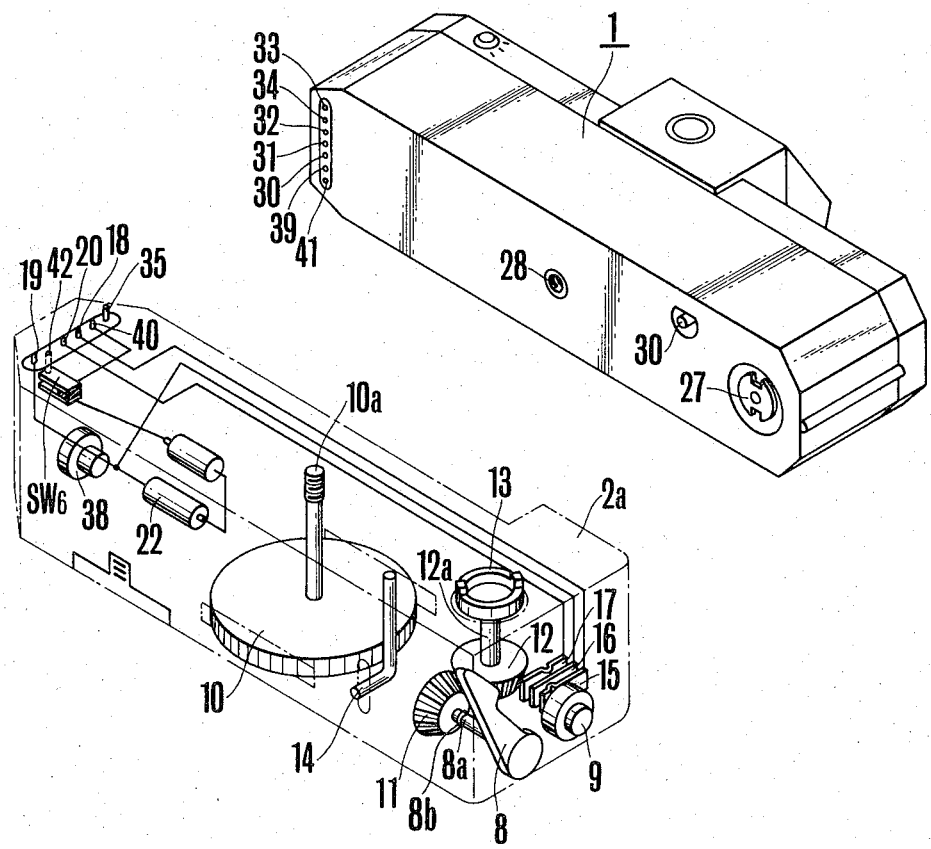
FIG. 5 is a perspective exploded view illustrating another embodiment of the present invention.

FIG. 5 is an exploded view illustrating another embodiment of the present invention.

Figure 6:
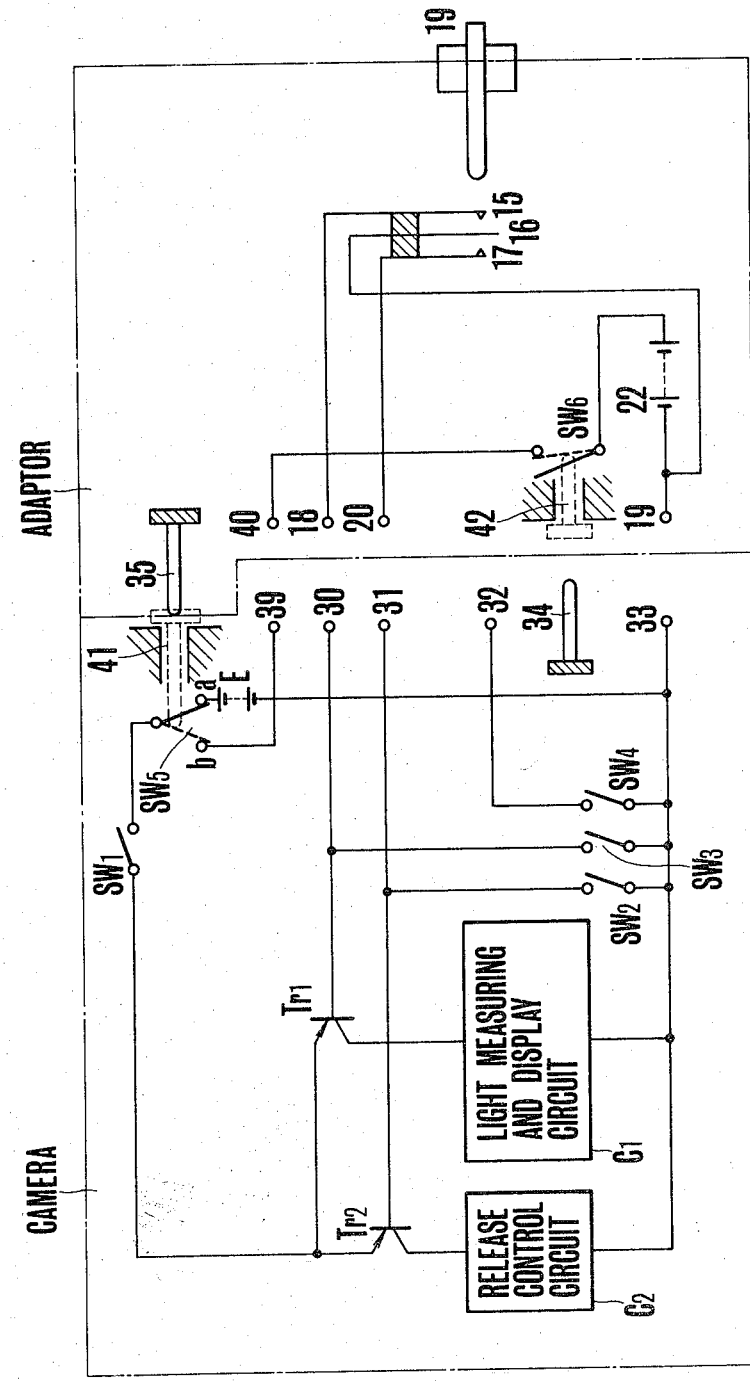
FIG. 6 is an electrical circuit diagram of the embodiment of FIG. 5.

FIG. 6 is an electrical diagram of the adapter and camera body of FIG. 5. The embodiment shown in FIGS. 5 and 6 may be considered as derived from FIGS. 3 and 4, but incorporating an electrical power source or battery in the adapter. The incorporated battery 22 of the adapter 2 is connected to interconnection terminals 19 and 40 upon contact with respective terminals 39 and 33 of the camera housing to introduce electrical energy into the camera. When the adapter 2 is attached to the camera body 1, a projection member 35 on the adapter switches a switch SW5 from position "a" to a position "b". When this occurs, instead of the electrical power source or battery E in the camera body supplying power, the battery 22 incorporated in the adapter supplies electrical energy to the various circuits of the camera. Upon removal of the adapter from the camera body, the switch SW5 is again turned on so that the electrical energy supplied to the various circuits of the camera is supplied by the battery E in the camera body. In order to prevent application of voltages from the batteries E and 22 to the interconnection terminals 39 and 40 when the adapter is detached from the camera body, the projection member 35 and a member 34 provides a mechanism for opening the the switches SW5 and SW6.

Figure 7:
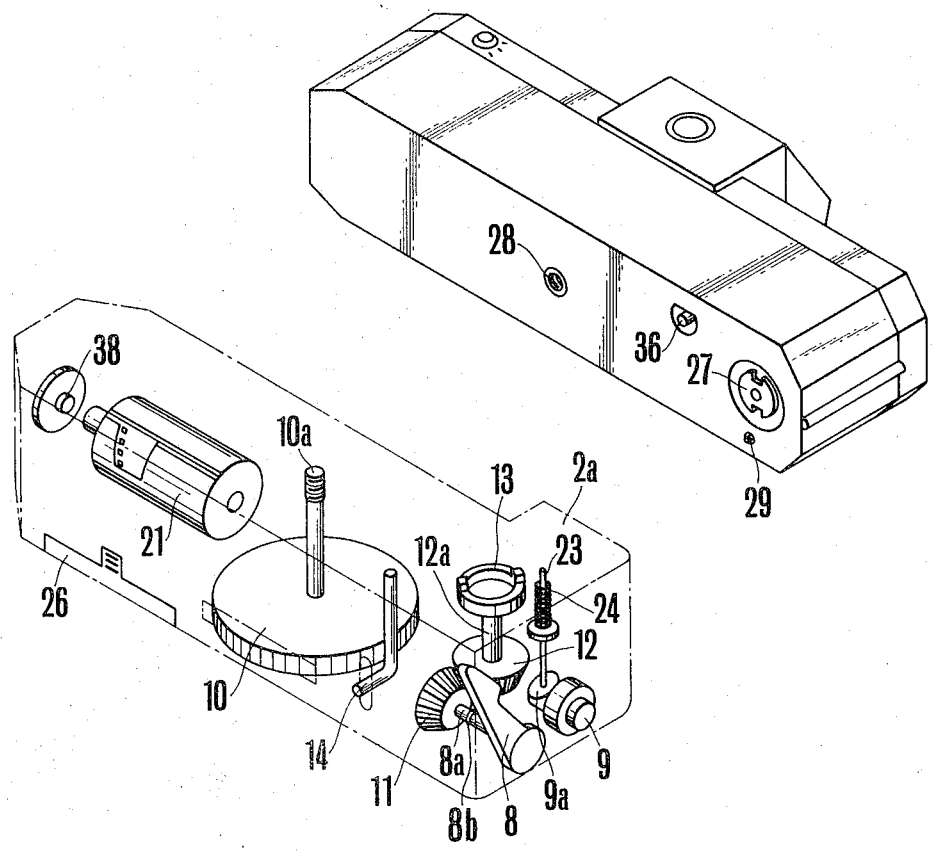
FIG. 7 is a perspective view illustrating still another embodiment of the present invention.

FIGS. 7 and 8 are perspective exploded views showing another system embodying the present invention. This embodiment differs from the earlier embodiments in that the release of the camera is effected mechanically. In FIG. 7, a release control member 23 responds to depression of the release button 9 by lifting upwardly against the force of the spring 24. When the adapter 2 reaches a fixed position with the bottom panel of the camera housing, the head of the control member 23 abuts against a release control member 29 in the camera body. Therefore, the depression of the release button 9 on the adapter housing can actuate the release mechanism within the camera body. This embodiment forms a chamber within the adapter housing for accommodating a spare or exposed film cartridge 21.

In FIG. 8, a tripod female screw 37 for receiving a tripod screw when the camera is set horizontally on a tripod is arranged below the fastener knob 10. A tripod female screw 38 receives the tripod for vertical shots on a tripod. As shown in FIG. 8, aside from the film cartridge, a spare battery or other photographic device may be contained in the chamber 26. The cover of the chamber 26 is provided with a screw 26a for fastening the cover to the adapter housing.

The use of the adapter for vertical shots, in accordance with the present invention, enables the photographer to hold the camera steadily for vertical shots by taking substantially the same natural attitude as for horizontal shots. This limits the possibility of blurred pictures due to movement of the camera during the shutter release in a vertical position and permits rapid film advance to avoid missing good pictures. It permits quick and easy change between horizontal and vertical exposures. Moreover, because the adapter of the present invention can be constructed to be light and small, the existence of the adapter does not hinder exposures with horizontal picture formats. It also provides room for spare photographic equipment.

While embodiments of the invention have been described in detail, it will be evident to those skilled in the art that the invention may be embodied otherwise without departing from its spirit and scope.

What is claimed is:

1. For an elongated film format camera having a housing and a winding arrangement with a manual winding member and a shutter release arrangement with a shutter release member located on the housing in a first position relative to an operator's hand position for convenient use when the camera is held for an elongated, horizontal film format, a vertical format adapter comprising:
   an adapter housing attachable to a camera housing,
   coupling means on said adapter housing for engaging the winding arrangement and the shutter release arrangement in the camera,
   a second manual winding member and a second shutter release member coupled to the coupling means and located on the adapter housing at positions corresponding to the first manual winding member and the first shutter release member relative to the hand of an operator when the adapter is attached to the camera and the adapter and camera are held for vertical film format.

2. An adapter as in claim 1, wherein said adapter housing includes a chamber for holding a spare photographic member.

3. An adapter as in claim 1, further comprising
   means for holding a battery,
   connecting means for connecting the battery, and
   selector means responsive to the attachment of said adapter to the camera to supply electrical power from the battery to the camera.

4. An adapter as in claim 1, further comprising
   two female threaded portions for receiving a tripod male screw,
   a botton panel on the adapter housing for holding one of said threaded portions, and
   a side panel on the adapter housing for holding the other of said threaded portions.

5. An adapter as in claim 1, wherein said coupling means includes a mechanical first coupling arrangement coupled to said second winding member for coupling to the winding arrangement in the camera and a second coupling arrangement connected to said second release member for coupling to the shutter release arrangement in the camera.

6. An adapter as in claim 5, wherein said second coupling means includes electrical transmitting means for transmitting an electrical signal from said second release operating member to said camera.

7. A camera system, comprising:
   a housing for holding film and shiftable into a plurality of film format positions including a normal position,
   first film winding operating means for operation when the housing is held in the normal film format position,
   first shutter release operating means for operation when the housing is held in the normal film format position,
   second winding operating means and second release operating means for operation when the housing is held in a second film format position at an angle to the first film format position,
   coupling means for coupling said first winding operating means and said second winding operating means,
   second coupling means for coupling said first release operating means and said second release operating means with each other,
   said first and second coupling means coupling said operating means so that each of said operating means is made effectively independent of the other in performing a winding operation and a releasing operation.

8. A camera system as in claim 7, wherein said first winding operating means and said second winding operating means are disposed on the housing at approximately right angles to each other.

9. A camera system as in claim 7, wherein
   in the normal film format position, said first winding operating means and said first release operating means are located parallel to each other on one upper face of the housing, and
   said second winding operating means and said second release operating means are provided on one side face of the housing.

* * * * *